(12) United States Patent
Kuramochi

(10) Patent No.: US 6,886,220 B2
(45) Date of Patent: May 3, 2005

(54) HINGE DEVICE

(75) Inventor: Ryuta Kuramochi, Yokohama (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 10/654,385

(22) Filed: Sep. 3, 2003

(65) Prior Publication Data

US 2004/0045130 A1 Mar. 11, 2004

(30) Foreign Application Priority Data

Sep. 5, 2002 (JP) ...................................... 2002-260016

(51) Int. Cl.[7] .............................................. E05F 1/08
(52) U.S. Cl. ......................................... 16/286; 16/289
(58) Field of Search ........................ 16/286, 289, 290, 16/292, 327, 284; 399/379, 365

(56) References Cited

U.S. PATENT DOCUMENTS

| | | | | |
|---|---|---|---|---|
| 3,906,587 A | * | 9/1975 | Little .......................... | 16/190 |
| 4,520,977 A | * | 6/1985 | Holzhauser et al. ......... | 248/201 |
| 4,792,127 A | * | 12/1988 | Kortgen .................... | 267/64.15 |
| 4,853,750 A | * | 8/1989 | Murata et al. ................. | 355/75 |
| 5,621,501 A | * | 4/1997 | Matsuo et al. ................. | 355/75 |
| 6,327,457 B1 | * | 12/2001 | Hashimoto .................. | 399/379 |
| 6,415,477 B1 | * | 7/2002 | Hosaka et al. ................ | 16/327 |
| 6,453,804 B1 | * | 9/2002 | Lee .............................. | 99/470 |

FOREIGN PATENT DOCUMENTS

| | | | | |
|---|---|---|---|---|
| JP | 5-8599 | 3/1993 | | |
| JP | 11-174597 | 7/1999 | | |
| JP | 2003134283 A | * | 5/2003 | ............ H04N/1/00 |

* cited by examiner

Primary Examiner—Suzanne L Barrett
Assistant Examiner—Mark Williams
(74) Attorney, Agent, or Firm—Notaro & Michalos P.C.

(57) ABSTRACT

A hinge device comprises: an attachment member attached on an apparatus body side; a supporting member pivotally supported by the attachment member through hinge pins; a document press-contacting plate attached to the supporting member; compression springs elastically provided between the supporting member side and the attachment member in such a manner that the supporting member is enforced to pivot in a direction that the document press-contacting plate is opened; a damper set inside the compression springs and provided between the attachment member side and the free end side of the supporting member so that an abrupt pivoting at and from a predetermined angle measured from the supporting member is buffered. This hinge device allows an adjustment of the elastic force of the compression springs without changing the operation angle of the damper, by attaching an adjustment plate on the damper movably in an axial direction, and by elastically providing the compression springs between the adjustment plate and either of the supporting member side or the attachment member side.

4 Claims, 8 Drawing Sheets

HINGE DEVICE

BACKGROUND OF THE INVENTION

1. Field of the Invention

The present invention relates to a hinge device suitable for opening and closing a document press-contacting plate of a copying machine, a printing machine, and the like.

2. Description of the Related Art

In the conventional copying machines, printing machines, and the like, a document press-contacting plate with a built-in automatic document feeder, which is relatively heavy in weight has been widely used, and for opening and closing such document press-contacting plates, such a hinge device as shown in the Japanese Patent Laid-open No. Hei11-174597 is publicly known.

The conventionally structured hinge device (a device for opening and closing a document press-contacting plate) comprises: an attachment member attached on an apparatus body side; a support member supporting a document press-contacting plate which is pivotally attached to the attachment member through a hinge pin; a pair of spring cases also serving as spring reception members pivotally supported by the supporting member side and the attachment member in a manner to be swingable and mutually compressible; compression springs elastically provided between the pair of spring cases; and a damper set inside the compression springs and fixably provided in either one of the spring cases.

Further, as a means to adjust rotation torque of the supporting member by changing the elastic force of the compression springs, the one shown in the Japanese Utility-model Publication No. Hei5-8599, for example, in which a spring reception seat is provided on the base portion of one of the spring cases by using an adjusting screw in a manner to be axially movable is well known.

When the two publicly known arts described above are combined, a structure in which the base portion of the damper is fixed on the spring reception seat is conceived. However, with such a structure, a torque adjustment requires the distance between the confronting spring cases to be changed by moving the spring reception seat in the axial direction. This causes a problem where, upon a closing of a document press-contacting plate, the closure angle of the document press-contacting plate changes at and from which the damper arranged in the compression springs begins to operate.

SUMMARY OF THE INVENTION

The object of the present invention is to provide a hinge device which allows torque adjustment in a manner that the closure angle of the document press-contacting plate at which the damper operates remains constant.

In order to attain this object, the present invention comprises: an attachment member attached on an apparatus body side; a supporting member pivotally supporting the document press-contacting plate through a hinge pin; compression springs elastically provided between the supporting member side and the attachment member; and a damper housed in the compression spring, with the base portion thereof being swingably attached on both or either of the attachment member and/or the free side of the supporting member; an adjustment plate being attached on the damper movably in the axial direction, and the compression springs being elastically provided between the adjustment plate and either of the supporting member side or the attachment member side.

The damper referred above can be a fluid damper with a piston rod, and the base portion thereof on the cylinder side can be swingably attached to the attachment member side, or the base portion thereof can be swingably attached to the supporting member side.

Also in the present invention, the damper can be a telescope-type friction damper in which telescope parts are compressibly fitted to one another, and the base portion of telescope legs are swingably attached respectively on the attachment member side and the free end side of the supporting member.

Further, in the present invention, a pair of spring cases which are compressibly structured can be swingably attached between the attachment member and the supporting member, with the base portion of the damper being fixed on either of the pair of spring cases.

Furthermore, in the present invention, a lifting member can be rotatably fixed on the free end side of the supporting member, one of the spring cases can be pivotally supported in a manner to be swingable on a position different from the position on which the lifting member is fixed, and the other spring case can be pivotally supported on a position on the attachment side and different from the position on which the supporting member is pivotally fixed.

Moreover, in the present invention, the base portion of the damper can be fixed on one spring case side, which is pivotally supported on the attachment member side, the adjustment plate being attached movably in the axial direction is attached on the base portion of the damper, and the compression springs, with the damper being housed therein, can be elastically provided between the adjustment plate and the other spring case.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
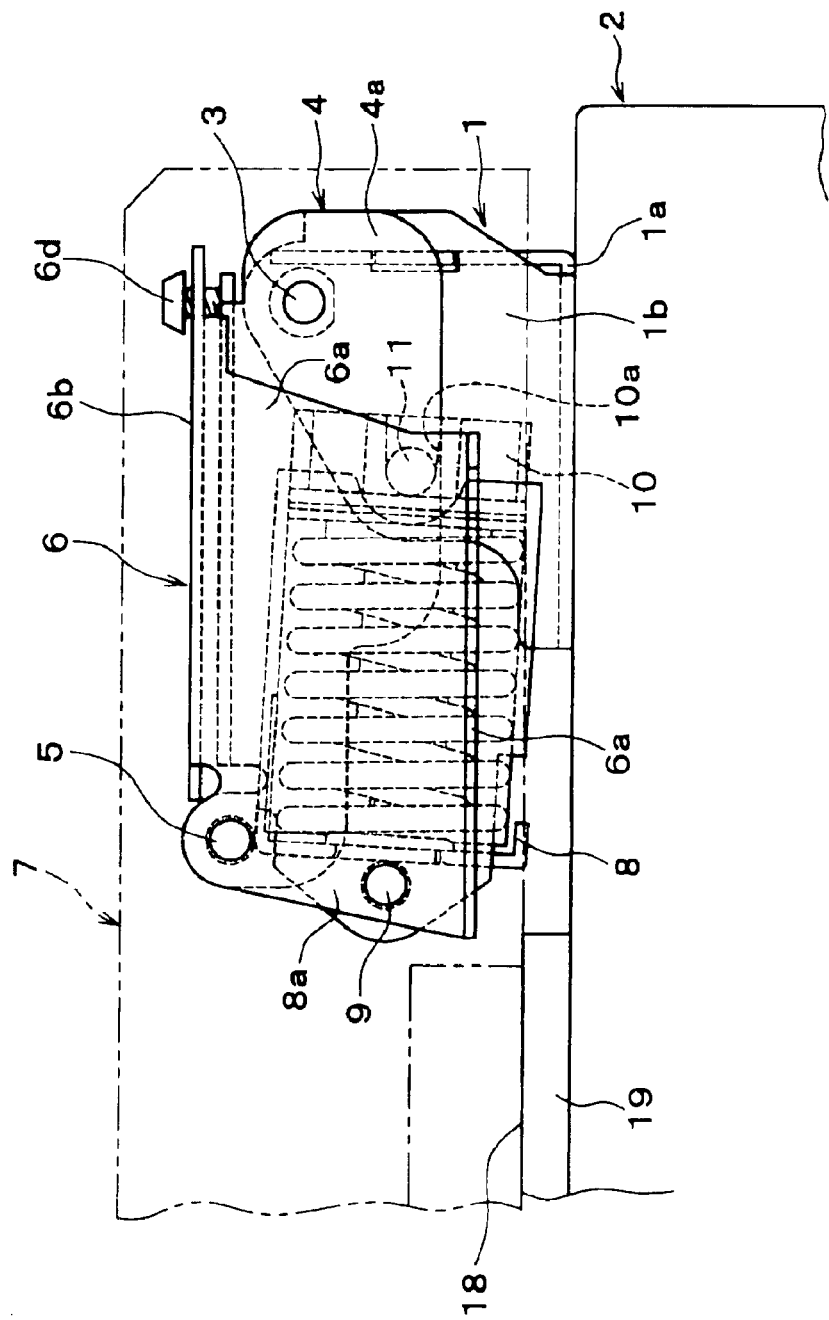
FIG. 1 is a side elevational view of a copying machine using a hinge device of the present invention.

An embodiment of the present invention applied to a copying machine will be explained in detail below with reference to the drawings.

In the drawings, the reference numeral 1 denotes an attachment member which is attached to the rear end on top of an apparatus body 2 of a copying machine, printer, or the like. A supporting member 4 is pivotally supported of its both side plates 4a and 4a through a first hinge pin 3 on both side plates 1b and 1b which are vertically positioned from the both sides of an attachment plate 1a of the attachment member 1.

On the free end sides of the both side plates 4a and 4a of the supporting member 4, a lifting member 6 is pivotally supported through a second hinge pin 5 so that its both side plates 6a and 6a are pivotable. This causes the pivoting directions of the supporting member 4 and the lifting member 6 to be opposite so that the attachment member 1, the supporting member 4, and the lifting member 6 are pivotally supported in a manner that they are folded to form a switchback line. To a back plate 6b of the lifting member 6 is fitted an adjusting screw 6d, and the tip portion thereof is abutted on a back plate 4b of the supporting member 4. Further, on attachment plates 6c and 6c of the lifting member 6, a document press-contacting plate 7 with an automatic document feeder is attached at the rear end thereof (not shown).

On a side of the lifting member 6 where is pivotally supported by the second hinge pin 5, a first spring case 8 which also serves as a spring reception member is pivotally supported by a third hinge pin 9 while changing its supporting position so that attachment plates 8a and 8a protruding on the top portion of the first spring case 8 can swing.

The first spring case 8 supports a second spring case 10 also serving as a spring reception member with support piece 8c and 8c, in a manner to be compressible. The second spring case 10 is swingably supported at a distance from the first hinge pin 3 on the both side plates 1b and 1b of the attachment member 1, through a pair of fourth hinge pins 11 and 11. The detachable support structure described above is formed by providing, on both sides of the bottom part of the second spring case 10, bearing grooves 10a and which receive fourth hinge pins 11 and 11. Incidentally, this structure is intended to facilitate an assembly of a hinge device of the present invention. Therefore it is possible that one piece of the fourth hinge pin may use instead of a pair of the fourth hinge pins 11 and 11, or that the bearing grooves 10a and 10a are communicative to each other to form one piece thereof. It is also possible that the bearing grooves 10a and 10a serve as a through-hole.

In the second spring case 10, a fluid damper 12 composed of a piston rod 12a and a cylinder 12b is fitted, in a manner that a base portion 12c of the cylinder 12b is fitted into a fit hole 10b provided at the center of the bottom of the second spring case 10. On a male screw portion 12d provided on the outer periphery of the base portion 12c, an adjustment plate 13 is rotatably fitted. The internal structure of the fluid damper 12 will be omitted to explain here, which is similar to the one described in the Japanese Patent Laid-open No. Hei9-311389. Further, the piston rod 12a protruding from the free end side of the fluid damper 12 confronts an inside top portion 8b inside the first spring case 8, and between the adjustment plate 13 and the inside top portion 8b inside the first spring case 8, a compression spring pair composed of a large compression spring 15a and a small compression spring 15b are elastically arranged through which the fluid damper 12 is inserted in the axial direction. Reference Numeral 16 is a washer of the fluid damper 12. Incidentally, while the description hereinbefore refers to an embodiment in which the fist spring case 8 and the second spring case 10 are used, such first spring case 8 and the second spring case 10 may be omitted, wherein the fluid damper 12 is arranged between the attachment member 1 and the supporting member 4.

Figure 2:
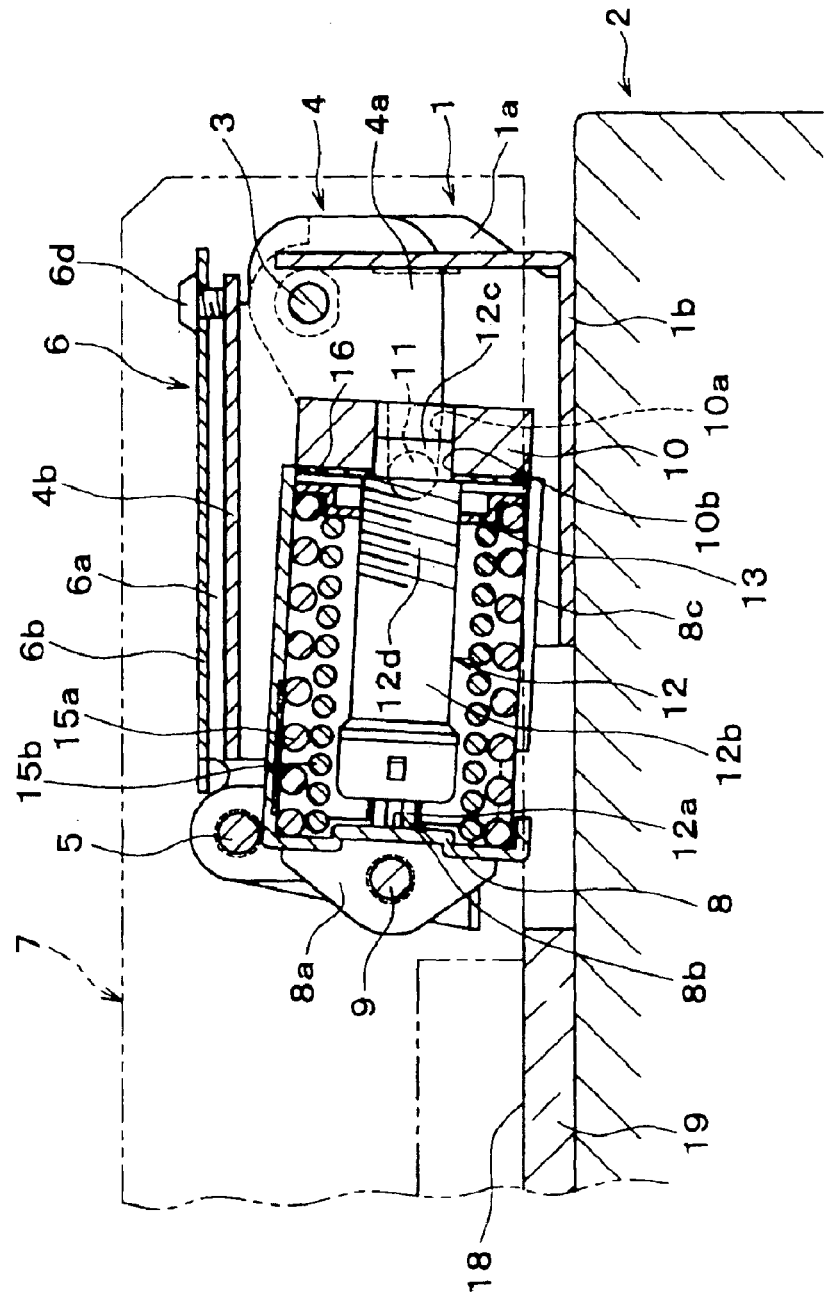
FIG. 2 is a vertical sectional view of an internal structure of the hinge device in a state shown in FIG. 1.

According to the description hereinbefore, when the document press-contacting plate 7 is closed as shown in FIG. 1 and FIG. 2, the supporting member 4 and the lifting member 6 are upfolded to each other, with the compression springs 15a and 15b being compressed within the first spring case 8 and the second spring case 10 which are forming one set of spring reception member. The compression springs 15a and 15b generate rotation torque around the first hinge pin 3 which pivotally supports the supporting member 4 which further supports the document press-contacting plate 7, in a direction so as to open the document press-contacting plate 7. By changing the elastic force of the compression springs 15a and 15b, the rotation torque generated around the first hinge pin 3 can be adjusted. Further, the piston rod 12a of the fluid damper 12 is compressed within the cylinder 12b.

When the document press-contacting plate 7 is opened from the state shown in FIG. 1 and FIG. 2, the supporting member 4 and the lifting member 6 together rotate with the first hinge pin 3 as fulcrum, so as to allow an opening operation of the document press-contacting plate 7 up to approximately 90 degrees. At that time, the rotation torque generated by the compression springs 15a and 15b causes the document press-contacting plate 7 to lightly open without feeling heaviness thereof. Additionally, the maximum degree of the opening angle is adjustable up to around 70 degrees by stopper means (not shown). As the document press-contacting plate 7 opens further, since the space between the first spring case 8 and the second spring case 10 is widened, the piston rod 12 is pressed out of the cylinder 12b, until being halted at a predetermined position.

When the opened document press-contacting plate 7 is closed, it is closed by pressing force by hand and the weight of the pressure-contact plate itself conquering the elastic force of the compression springs 15a and 15b. At that time, the document press-contacting plate 7 for document attempts to reverse, using the second hinge pin 5 of the lifting member 6 for the support member 4 as fulcrum. However, the first spring case 8 attached on the lifting member 6 through the third hinge pin 9 presses in the direction so that the lifting member 6 and the supporting member 4 are upfolded by the pressing force of the compression springs 15a and 15b. This prevents the document press-contacting plate 7 from reversing with the second hinge pin 5 as fulcrum upon normal closing operation. This reverse-prevention system of the lifting member 6 also functions when the document press-contacting plate 7 is unhanded from the opened state.

The closing operation of the document press-contacting plate 7 causes an accelerating force. Therefore, the document press-contacting plate 7 is closed at increased closing speed. At that time since the compression springs 15a and 15b are compressed to increase their elastic force, the lifting member 6 is pressed in the direction to be upfolded with the supporting member 4.

Since the document press-contacting plate 7, particularly with an automatic document feeder is heavy in weight, an abrupt closure may cause a breakage of a contact glass 19 or a shut-in of a hand. In this embodiment, when the document press-contacting plate 7 is closed to incline to the predetermined angle, the tip of the piston rod 12a of the fluid damper 12 is abutted to the inside top portion 8b of the first spring case 8, which exerts a buffer action, and thereby causing the document press-contacting plate 7 to be quietly closed from the predetermined closure angle (normally at 15 degrees), instead of being abruptly shut.

Further, when the document press-contacting plate 7 is unhanded at a predetermined closure angle where the elastic force of the compression springs 15a, 15b and the weight of the document press-contacting plate 7 balance, the document press-contacting plate 7 is supported as it is without free-falling, thereby allowing documents to be set on the contact glass 19 by using both hands. At that time, the document press-contacting plate 7 does not reverse with the second hinge pin 5 as fulcrum, as aforementioned.

Figure 3:
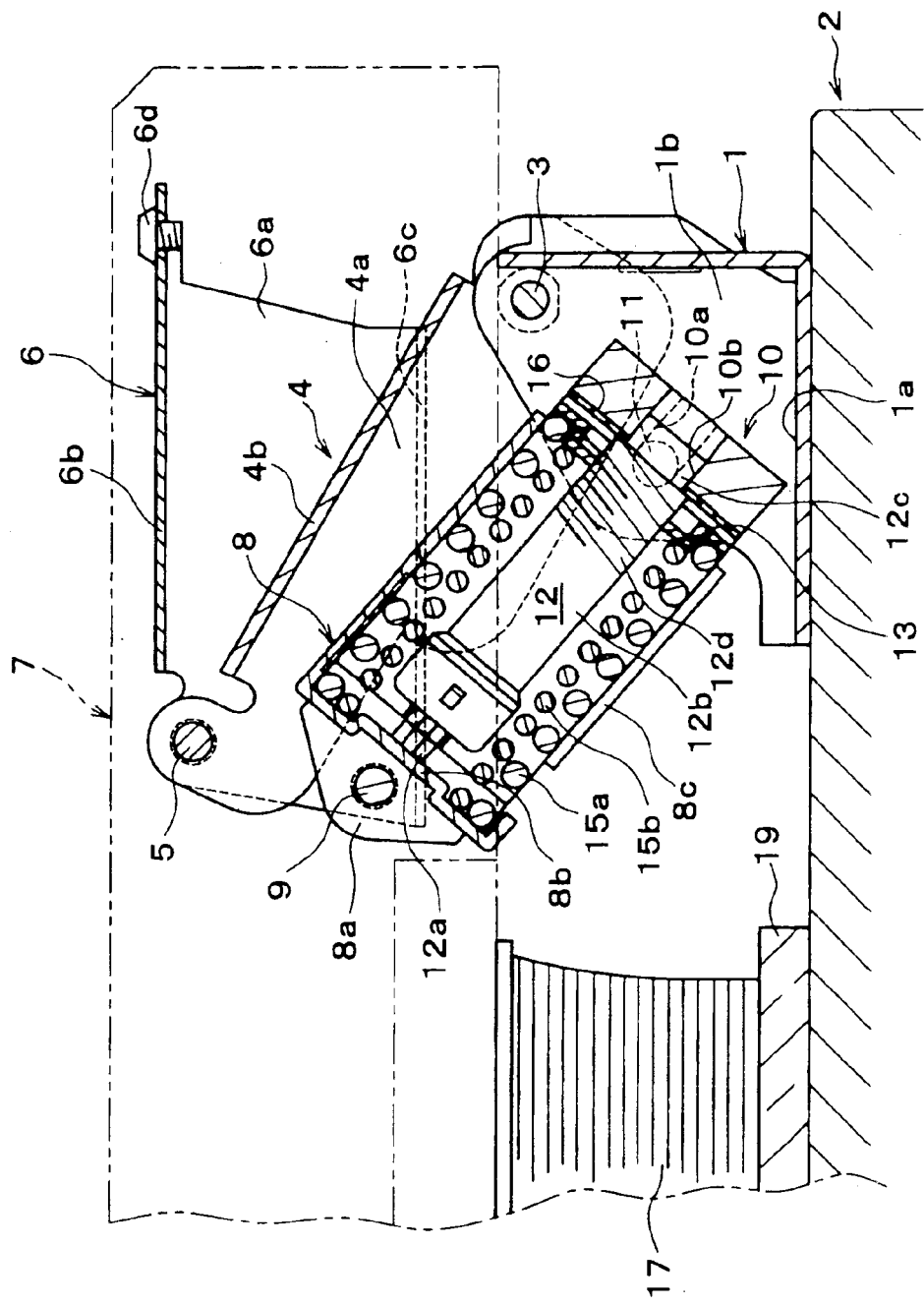
FIG. 3 is an explanatory view of an operation of the hinge device of the present invention.
Figure 4:
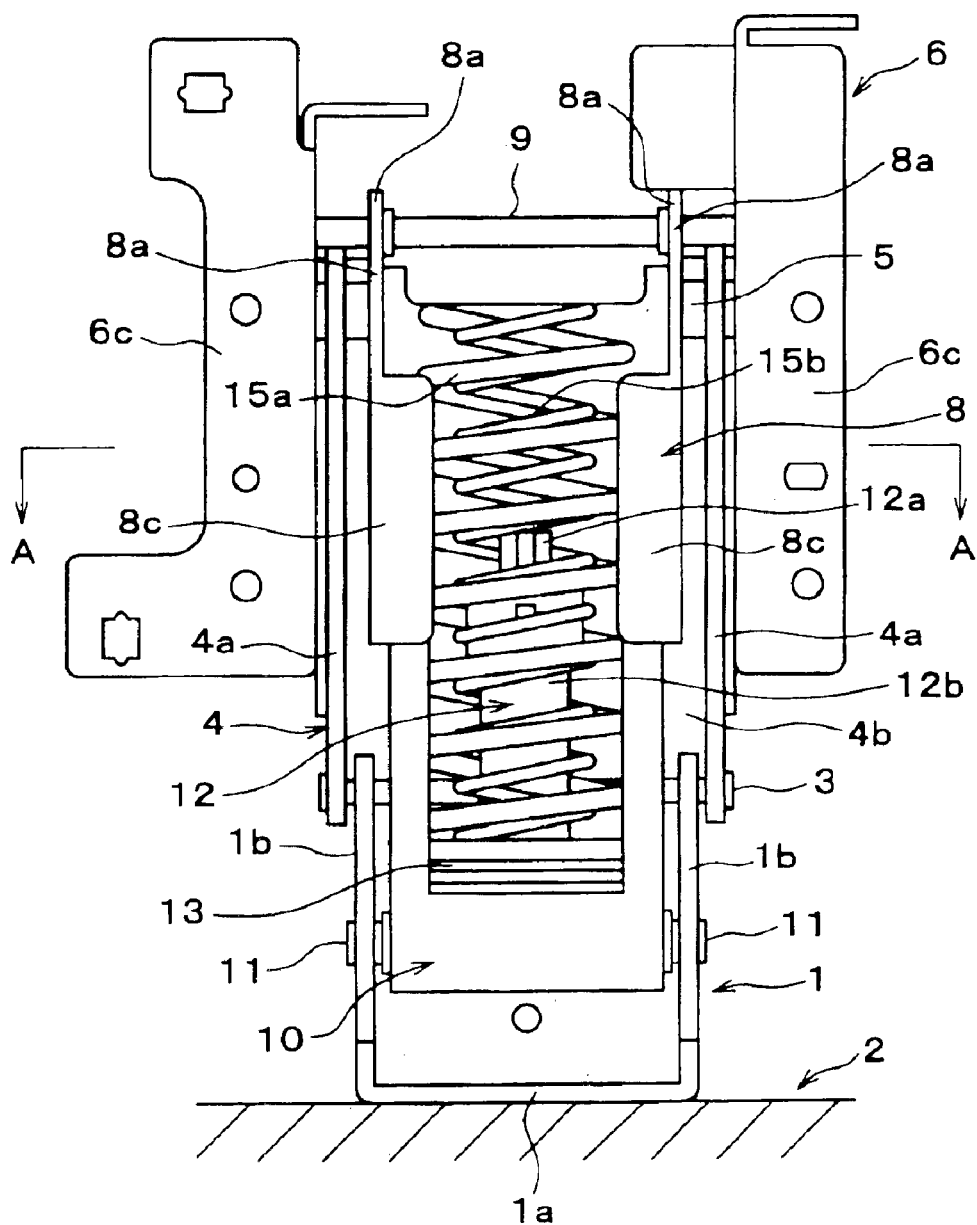
FIG. 4 is a front view of the hinge device of the present invention.
Figure 5:
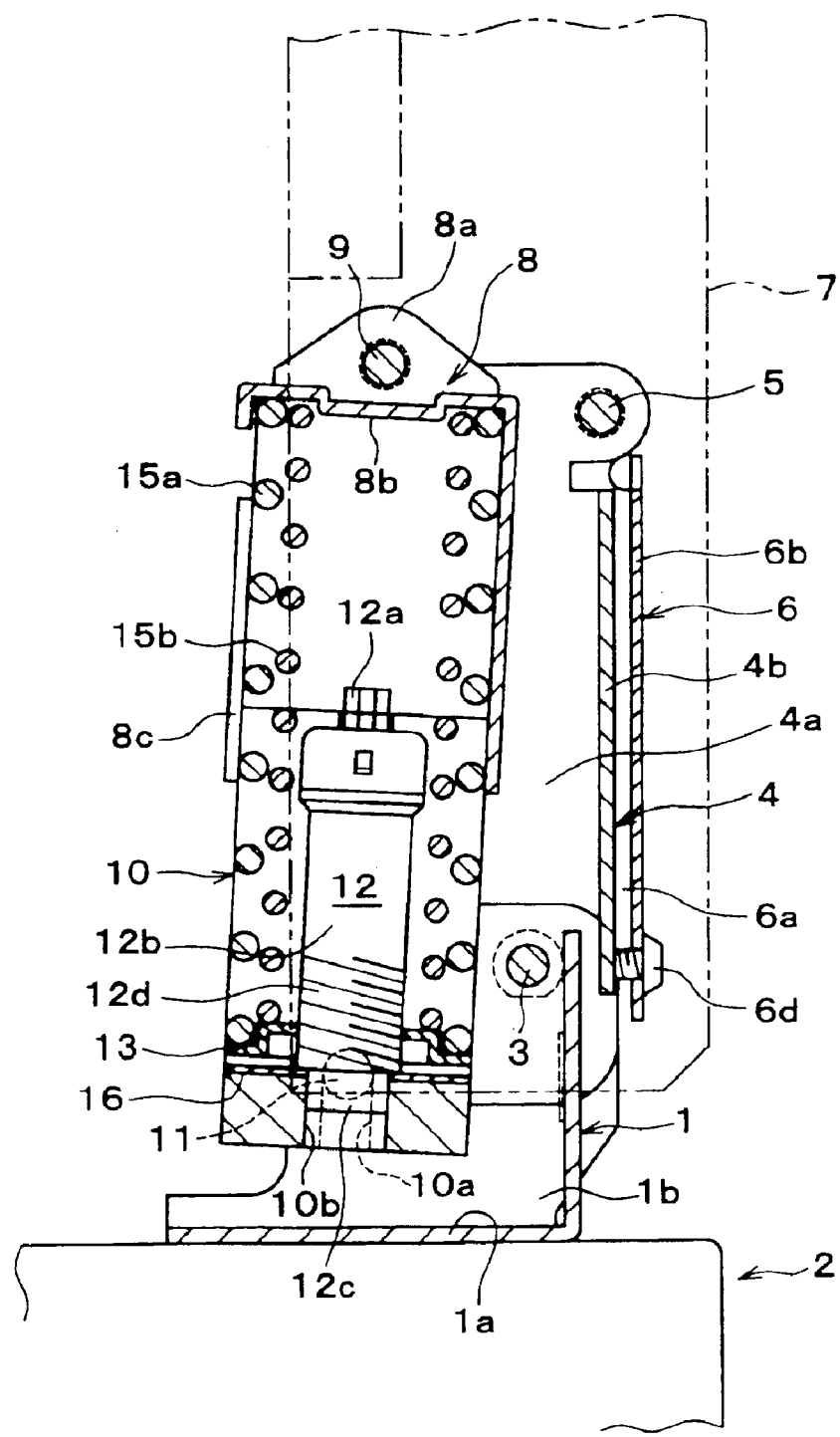
FIG. 5 is a vertical sectional view of a state shown in FIG. 4.
Figure 6:
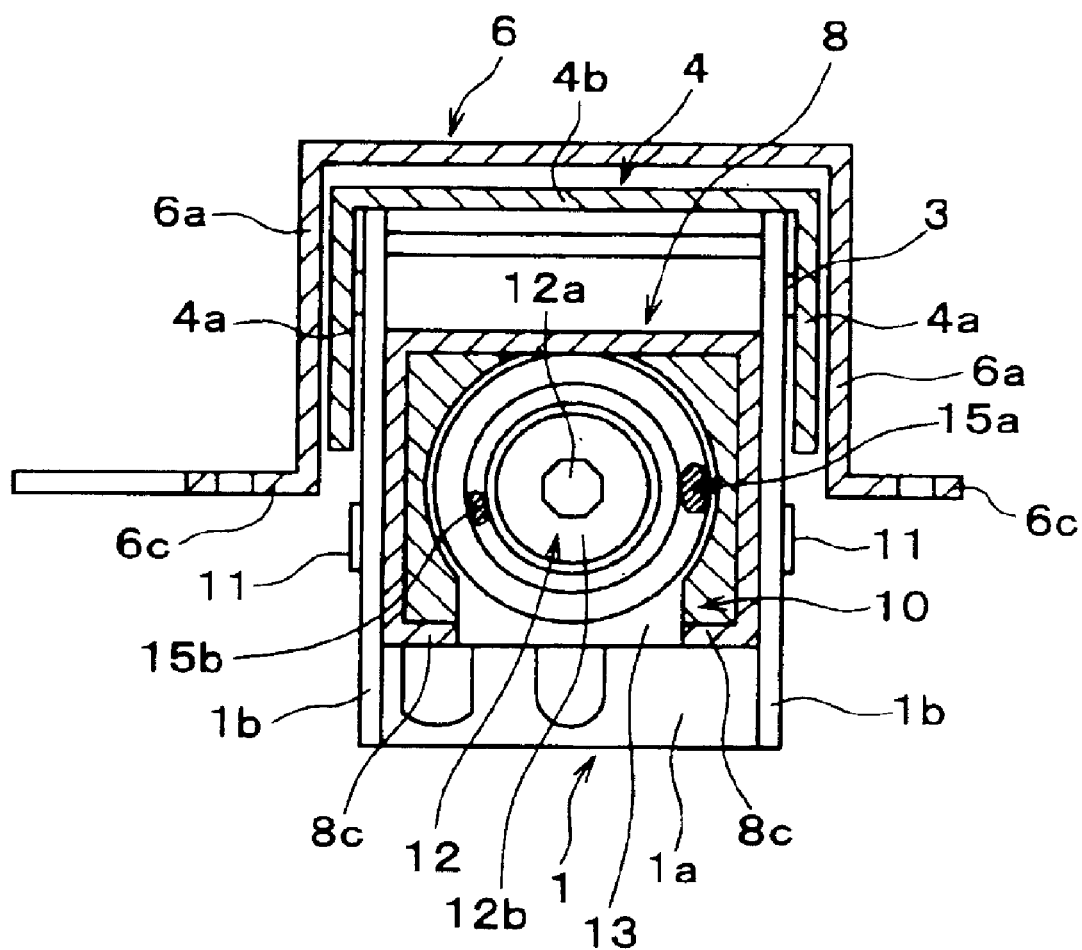
FIG. 6 is a sectional view taken along the A—A line in FIG. 4.

When copying a thick-volume document such as a book, particularly as shown in FIG. 3 where a thick-volume document 17 is laid on the contact glass 19 and the document press-contacting plate 7 is closed down, such document press-contacting plate 7 together with the lifting member 6 reverses with the second hinge pin 5 as fulcrum, in conquering the elastic force of the compression spring 15a and 15b, thereby horizontally covering the thick-volume document 17, which prevents an exposure from leaking-out as much as possible.

Figure 7:
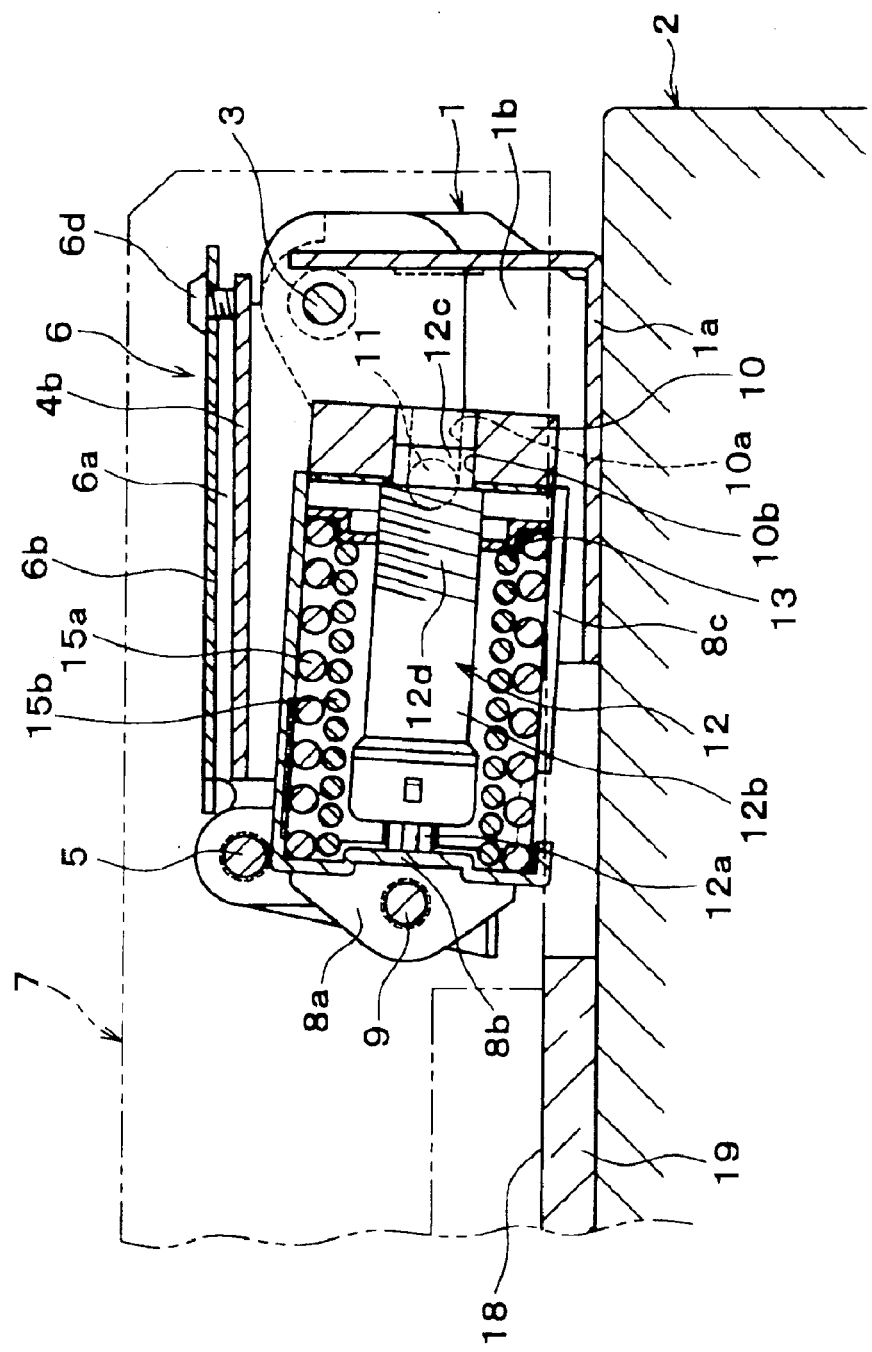
FIG. 7 is a vertical sectional view of an operation of an adjustment plate of the hinge device in a state of FIG. 2.

Furthermore, for an adjustment of rotation torque according to the weight of the document press-contacting plate 7, as shown in FIG. 7, the attachment position of the adjustment plate 13 for the male screw portion 12d of the base portion 12c of the fluid damper 12 is shifted so as to change the elastic force of the compression springs 15a and 15b. This causes the rotation torque being generated around the first hinge pin 3 by the supporting member 4 to be adjustable. However, at that time, the distance between the tip of the piston rod 12a of the fluid damper 12 and the inside top portion 8b of the first spring case 8 remains constant.

Such a shift of the adjustment plate 13 is implemented by rotating the fluid damper 12 itself together with the cylinder 12b through a rotation of the piston rod 12a over the compression springs 15a and 15b, since the adjustment plate 13 itself is non-rotationally fixed within the second spring case 10. Not to mention, there are many other methods for adjusting rotation torque than described herein.

The present invention also can be applied to a hinge device in which the document press-contacting plate 7 is directly attached to the supporting member 4 without using the lifting member 6. As with the aforementioned embodiment, the adjusting screw 6d attached on the lifting member 6 is intended for adjusting the document press-contacting plate 7 to be pressed against the contact glass 19 by a uniform pressing force, whereby a misalignment of a thin-volume document 18 upon closure of the document press-contacting plate 7 or a skewing of a document upon an operation of the automatic document feeder can be prevented.

Figure 8:
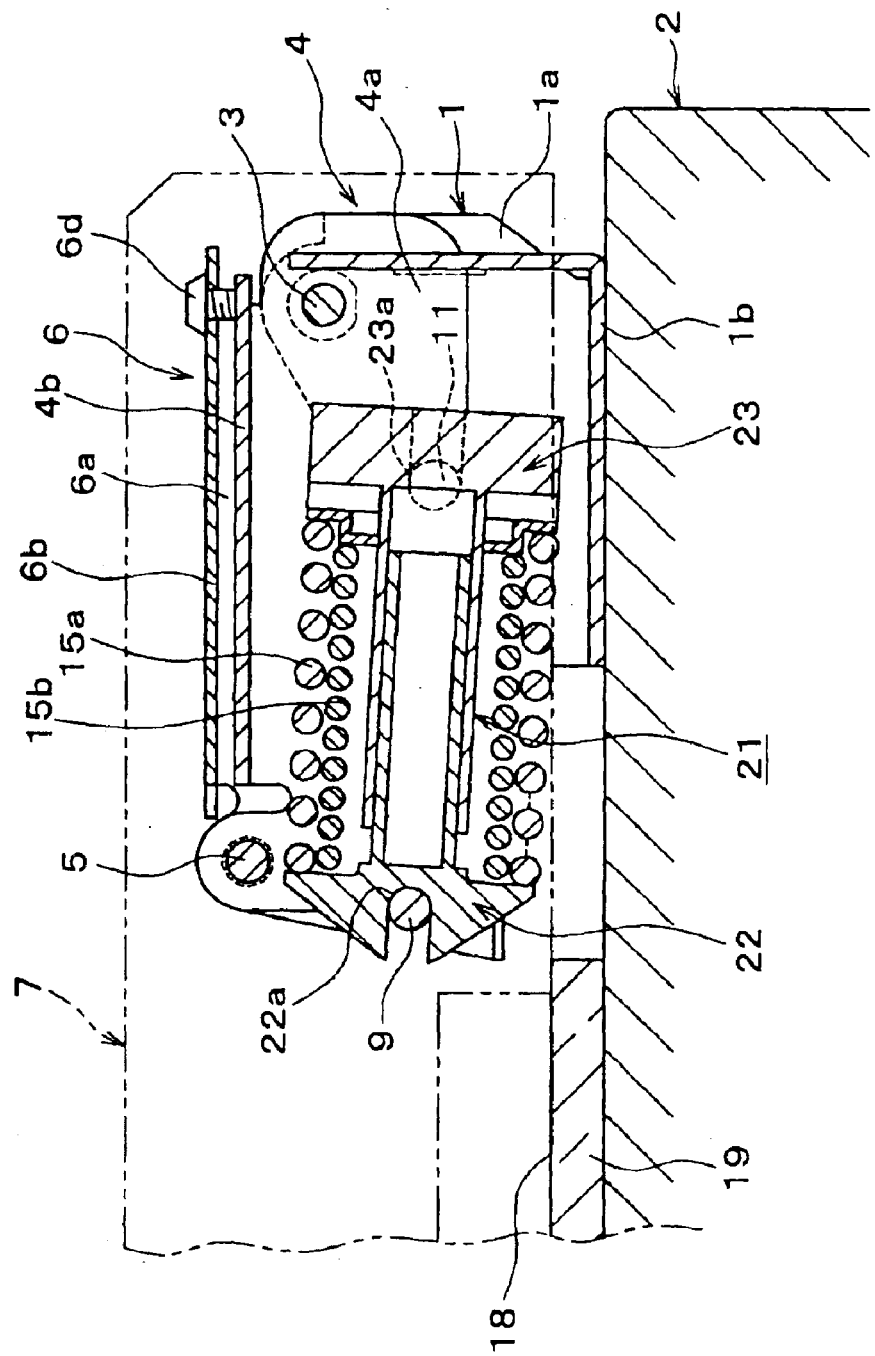
FIG. 8 is a vertical sectional view of another embodiment of the hinge device of the present invention.

It should be added that the structure of the fluid damper 12 is not limited to the one described above, but as shown in FIG. 8, for example, a compressible and combined telescope damper 21 is adopted to be a friction-type damper in which a friction force abruptly increases at and from the predetermined compressing position. In this structure, base portions 22a and 23a respectively of telescope legs 22 and 23 are swingably fixed to the supporting member side and the attachment member side, through the third hinge pin 9 and the fourth hinge pin 11. Further, the adjustment plate 25 is fitted into the outer side of the base portion of one telescope leg 23 in a manner that it can move in the axial direction. This adjustment plate may be attached on the base portion of the other telescope leg 22.

While a specific embodiment of the invention has been shown and described in detail to illustrate the application of the principles of the invention, it will be understood that the invention may be embodied otherwise without departing from such principles.

What is claimed is:

1. A hinge device for connecting a document press-contacting plate to a body side of an apparatus body, comprising:

an attachment member having a pair of attachment member side plates at a distance from each other, the attachment member being adapted to be attached on the apparatus body on the body side;

a supporting member having a pair of supporting member side plates pivotally attached by a first hinge pin to the attachment member side plates, the supporting member side plates each having a free end spaced from the first hinge pin;

a lifting member adapted to be connected to the document press-contacting plate and being pivotally attached by a second hinge pin to the free ends of the supporting member side plates;

a first spring case housed in said supporting member and swingably attached by a third hinge pin to the free ends of the supporting member, the third hinge pin being positioned at the body side of the apparatus body and being spaced from the second hinge pin;

a second spring case compressibly fitted to the first spring case and having a base portion that is swingably attached by a fourth hinge pin to the attachment member, the fourth hinge pin being positioned at the body side of the apparatus body and being spaced from said first hinge pin, the base portion of the second spring case having an attachment hole;

a damper having a fixing side and a cylinder, the cylinder having one end inserted and fixed into the attachment hole of the base portion of the second spring case, the damper having a male screw portion on the fixing side;

an adjustment plate screwed to the male screw portion of the damper; and at least one compression spring with said damper being housed therein and being elastically provided between the adjustment plate and an inside top portion of said first spring case.

2. A hinge device according to claim 1, wherein said damper is a telescoping friction damper in which telescope parts of the damper are compressibly fitted to one another, and one of the telescope parts has telescope legs attached respectively on said attachment member and the free ends of said supporting member side plates.

3. A hinge device according to claim 1, wherein said first spring case includes a pair of support pieces formed by being bent inside from side plates of the first spring case to support and confine said second spring case inside the first spring case by the pair of support pieces.

4. A hinge device according to claim 1, wherein said second spring case is made of plastic, the one end of said cylinder of said damper inserted into the attachment hole of the base portion being a small diameter portion, the cylinder having a large diameter portion adjacent the small diameter portion, and a washer in the second spring case, engaged on the small diameter portion and engaged against the large diameter portion.

* * * * *